(12) United States Patent
Chang (10) Patent No.: US 9,273,821 B2
(45) Date of Patent: Mar. 1, 2016

(54) POSITIONING DEVICE WORKING WITH FIXER FOR HANDHELD, PORTABLE, MOBILE DEVICE

(71) Applicant: Michael Chau-Lun Chang, Taipei (TW)

(72) Inventor: Michael Chau-Lun Chang, Taipei (TW)

( * ) Notice: Subject to any disclaimer, the term of this patent is extended or adjusted under 35 U.S.C. 154(b) by 489 days.

(21) Appl. No.: 13/657,886

(22) Filed: Oct. 23, 2012

(65) Prior Publication Data

US 2014/0110895 A1    Apr. 24, 2014

(51) Int. Cl.
| | |
|---|---|
| *B23Q 1/64* | (2006.01) |
| *F16M 13/00* | (2006.01) |
| *H04B 1/3888* | (2015.01) |
| *F16M 11/04* | (2006.01) |
| *F16M 11/20* | (2006.01) |
| *F16M 11/38* | (2006.01) |
| *F16M 13/02* | (2006.01) |
| *H04M 1/04* | (2006.01) |

(52) U.S. Cl.
CPC ............ *F16M 13/00* (2013.01); *F16M 11/041* (2013.01); *F16M 11/2014* (2013.01); *F16M 11/2092* (2013.01); *F16M 11/38* (2013.01); *F16M 13/022* (2013.01); *H04B 1/3888* (2013.01); *H04M 1/04* (2013.01)

(58) Field of Classification Search
USPC ................. 269/3, 6, 271, 85, 143, 249, 71, 8; 29/244–282; 248/683, 351, 354.1, 248/354.3, 230.6, 230.5, 230.4, 231.71, 248/231.61, 231.51, 316.1, 316.5, 316.6; 379/446, 454, 455; 455/575.1; 294/209, 210, 211
See application file for complete search history.

(56) References Cited

U.S. PATENT DOCUMENTS

| | | | | |
|---|---|---|---|---|
| 3,784,140 | A * | 1/1974 | Auerbach | 248/214 |
| 3,807,718 | A * | 4/1974 | Sendoykas | 269/6 |
| 4,569,511 | A * | 2/1986 | Bell, Jr. | 269/276 |
| 5,246,197 | A * | 9/1993 | MacDonald | 248/689 |
| 5,895,035 | A * | 4/1999 | Bley | 269/6 |
| 5,960,689 | A * | 10/1999 | Warren | 82/127 |
| 6,019,329 | A * | 2/2000 | Edelstein | 248/228.3 |
| 8,085,481 | B2 * | 12/2011 | Hill | G03B 3/00 248/229.24 |
| 2001/0006270 | A1 * | 7/2001 | Baculy | 269/166 |
| 2006/0278785 | A1 * | 12/2006 | Wiesner | A61M 5/1415 248/231.71 |
| 2008/0099645 | A1 * | 5/2008 | Reichley | 248/285.1 |
| 2011/0001022 | A1 * | 1/2011 | Edinger | 248/103 |

* cited by examiner

*Primary Examiner* — Monica Carter
*Assistant Examiner* — Nirvana Deonauth (57) ABSTRACT

A positioning device working with a fixer for handheld, portable, mobile devices includes a securing member coupled to the fixer that serves to hold a mobile device in position. The securing member has a locking unit and a first connecting portion for engaging with the fixer. The securing member can secure the fixer onto an external article with the locking unit securing the securing member to the external article, so as to rapidly, removably suspend the mobile device at a nearby handrail. Thereby, the mobile device is strongly positioned over the external article by the locking unit and prevented from swinging or being displaced.

7 Claims, 8 Drawing Sheets

POSITIONING DEVICE WORKING WITH FIXER FOR HANDHELD, PORTABLE, MOBILE DEVICE

BACKGROUND OF THE INVENTION

1. Technical Field

The present invention relates to a positioning device that is configured to work with a fixer for handheld, portable, mobile devices to hold and suspend a mobile electronic device, such as a mobile phone, a portable game player, an electronic book, a GPS device or a tablet computer.

2. Description of Related Art

Recently, handheld, mobile devices such as mobile phones and tablet computers have been popular, and nowadays almost everyone has one. While these mobile devices are relatively compact and light-weight, holding them in hand for a sustained time period is still a significant, accumulative burden to muscle, and this is particularly true for people lacking exercise.

There are some fixers designed for small-size mobile devices, but these fixers commonly fail to provide the advantages desired by users, such as being easy to mount and dismount, being compact and light, and being retractable, thereby being more portable.

The existing fixing tools for mobile devices are mainly using a flexible hose ended with a clamp that is configured to hold the whole tool on a table plate. While such an existing fixing tool is effective in suspending a mobile device over a table, it is structurally weak and tends to deform and come down after a long term of suspension. Also due to its weakness, for operating the mobile device, a user has to first use one hand support the mobile device from its back and then use the other hand to touch the touch screen. Thus causes the existing fixing tools to be unfavorable to mobile device operation.

Moreover, in the existing fixing tool, the clamp can only work well with a planar support. However, when leaving a house and used in a public transportation vehicle, such as a MRT train, a subway or a bus, where there are only vertical mopstick handrails, the fixing tool fails because its clamp cannot engage with the handrails effectively. The above-mentioned problems are for us to solve.

BRIEF SUMMARY OF THE INVENTION

The present invention provides a portable positioning device that is configured to work with a fixer to hold and suspend a mobile electronic device, such as a mobile phone, a portable game player, an electronic book, a GPS device or a tablet computer. The primary objective of the present invention is to suspend a mobile device with proper overall rigidity, so that a user can operate the suspended mobile device by touching or sliding on its touch screen without displacing the mobile device from where it is positioned. Also, the disclosed fixer is configured to firmly grasp a smooth, vertical rod, so that a user riding a public transportation vehicle can conveniently suspend and use his/her mobile device in the vehicle, wherein the positioning device and the fixer supports the mobile device with proper overall rigidity, so that a user can operate the suspended mobile device by touching or sliding on its touch screen. Thereby, the present invention is helpful to prevent users' muscle fatigue and ache caused by overuse of neck and shoulder muscles.

To this end, the present invention provides a positioning device working with a fixer for handheld, portable, mobile devices, the positioning device comprising a securing member that is coupled to an external fixer, the fixer having a positioning frame for holding an external mobile device in position, and the positioning device being characterized in:

The securing member having a first connecting portion for engaging with the fixer, the securing member being configured to fix the fixer as well as the positioning frame to an external article by grasping, buckling, mounting, enclosing, sucking or piercing the external article so as to suspend the mobile device, the securing member be able to be detached from the external article easily, the external article being a planar or bar-like article, the securing member having a locking unit for securing the securing member to the external article, and the securing member being able to grasp a horizontal or vertical, planar or bar-like article, whereby when a user touches and operates the mobile device, the mobile device is strongly positioned over the external article by the locking unit and prevented from swinging or being displaced.

DETAILED DESCRIPTION OF THE INVENTION

FIG. 1 through FIG. 10 disclose a first embodiment of the present invention. Therein, according to the present invention, a positioning device working with a fixer for handheld, portable, mobile devices has a securing member 3 for being coupled to an external fixer. The fixer includes a positioning frame 2 that serves to hold an external mobile electronic device 9 in position. The external mobile electronic device 9 may be a mobile phone, a portable game player, an electronic book, a GPS device or a tablet computer.

Figure 1:
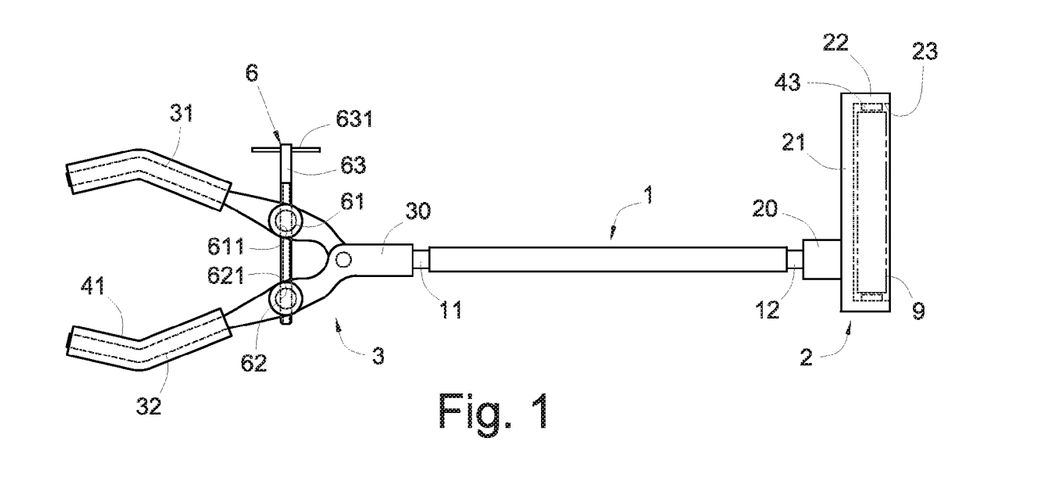
FIG. 1 is a front view of a first embodiment of the present invention.
Figure 2:
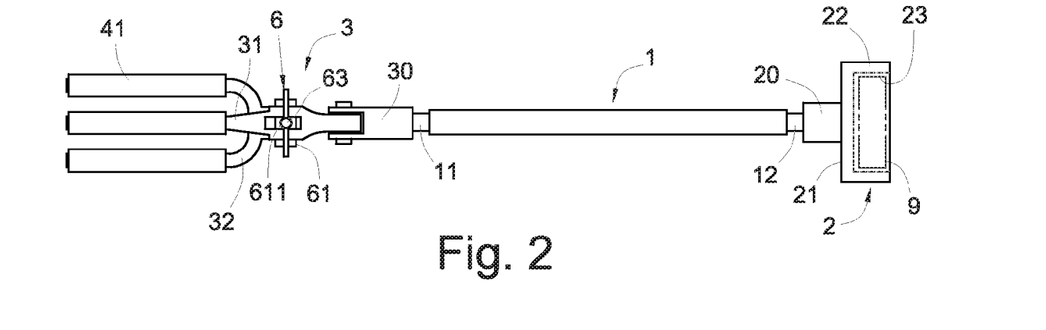
FIG. 2 is a top view of FIG. 1.

The securing member 3 includes a first connecting portion 30 for engaging with the fixer, and the securing member 3 can fix the fixer as well as the positioning frame 2 to an external article by grasping, buckling, mounting, enclosing, sucking or piercing the external article so as to suspend the mobile device 9. The securing member 3 can also be detached from the external article easily. The external article may be a planar or bar-like article. The securing member 3 is provided with a locking unit 6 for ensuring the combination between the securing member 3 and the external article. The securing member 3 can grasp a horizontal or vertical, planar or bar-like article, so that when a user touches and operates the mobile device 9, the mobile device 9 is strongly positioned over the external article by the locking unit 6 and prevented from swinging or being displaced.

The fixer includes an extension rod 1 that is rigid in a vertical direction or in a horizontal direction. The positioning frame 2 is provided at one end of the extension rod while the securing member 3 is deposited at an opposite end of the extension rod 1.

Figure 9:
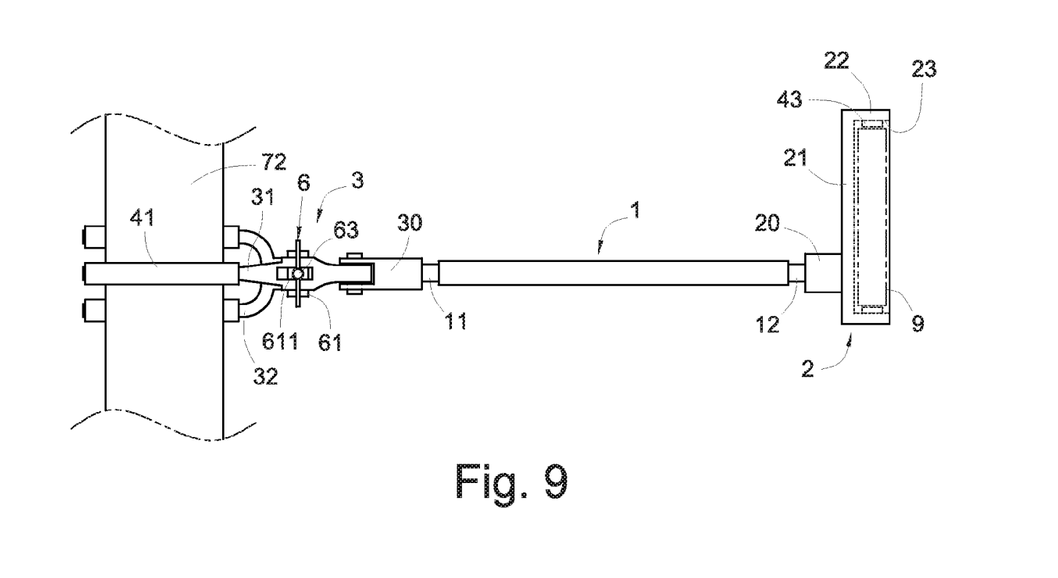
FIG. 9 is an applied view of the present invention.
Figure 10:
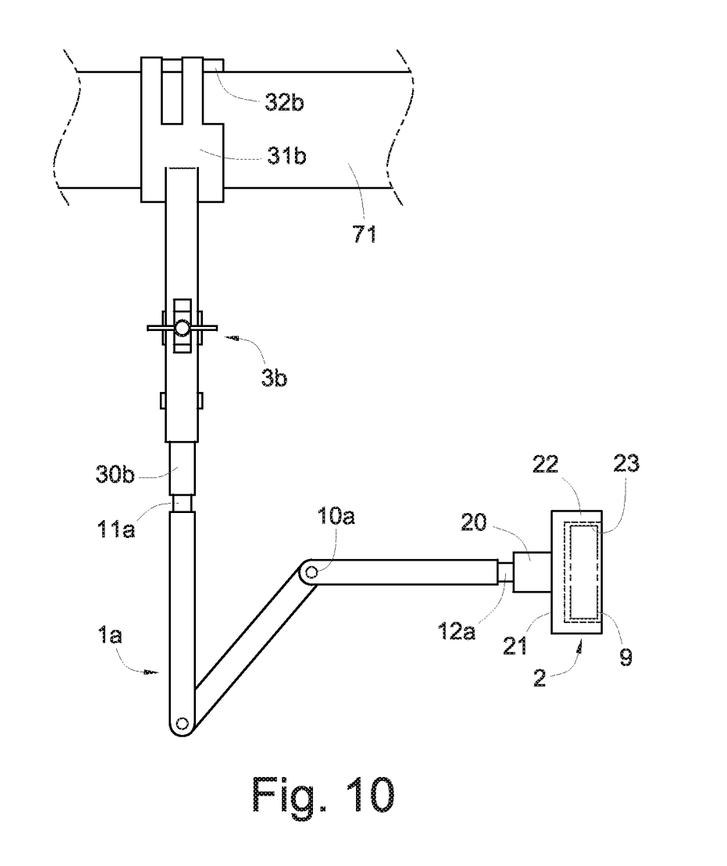
FIG. 10 is another applied view of the present invention.

The securing member 3 is configured to rapidly and firmly grasp the external article no matter it is a horizontal or vertical planar structure, a cylinder or a lengthwise rod, pole or bar-like support. The rod may be a horizontal handrail 71 or a vertical handrail provided in a public transportation vehicle for passengers to hold.

The securing member 3 has at least one movable clamping jaw 31 or 32.

The securing member 3 has at least two symmetrical movable clamping jaws 31 and 32, and each of the clamping jaws 31 and 32 has the same size in length. The locking unit 6 comprises pivots 61 and 62 provided at corresponding locations of the clamping jaws 31 and 32, respectively. Each of the pivots 61 and 62 is formed with a threaded hole 611 or 621. The locking unit 6 also includes a threaded bolt 63 screwedly passing through the threaded holes 611 and 621 of the pivots 61 and 62 of the clamping jaws 31 and 32. The threaded bolt 63 serves to adjust an included angle between the clamping jaws 31 and 32 unilaterally, so as to hold or release the external article. The threaded bolt 63 has one end provide with an adjusting lever 631 for a user to operate and thereby drive the threaded bolt 63 to rotate.

Figure 5:
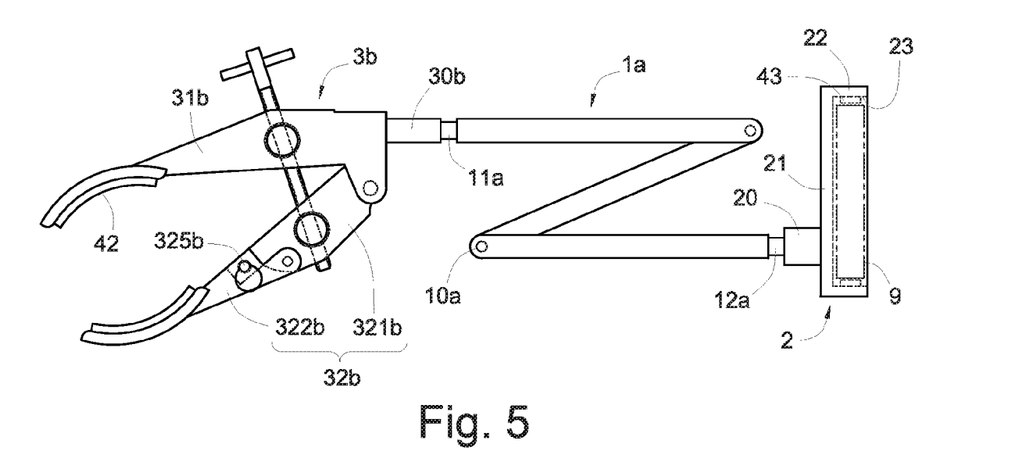
FIG. 5 is a front view of another additional mode of FIG. 1.
Figure 6:
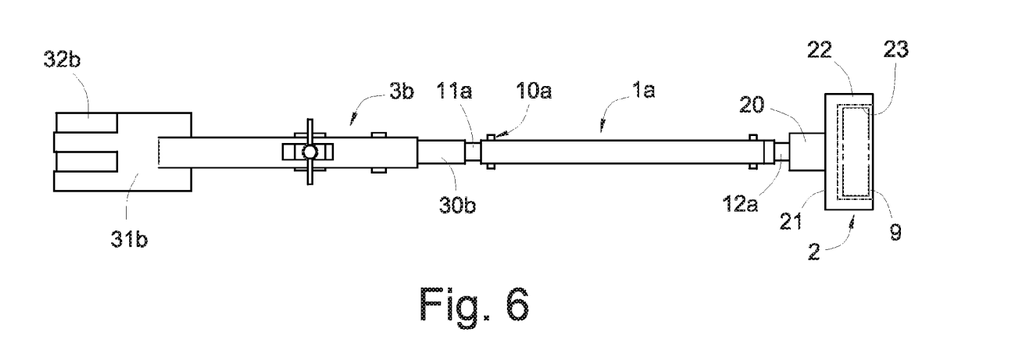
FIG. 6 is a top view of FIG. 5.
Figure 7:
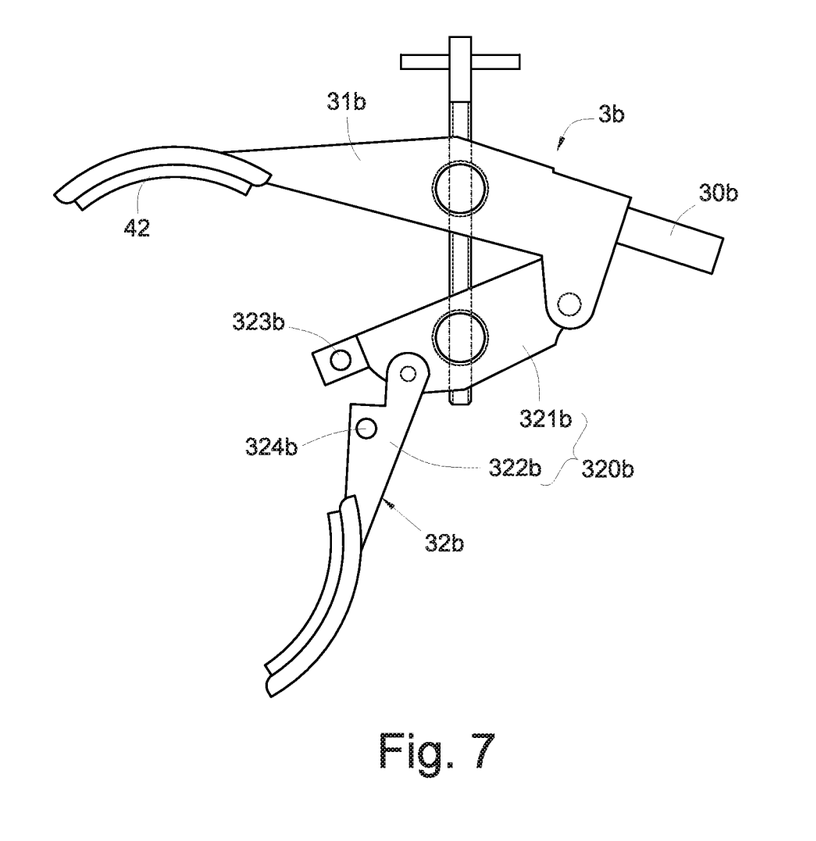
FIG. 7 is a partial, enlarged, applied view of FIG. 5.

Alternatively, the securing member 3a has at least two symmetrical movable clamping jaws 31a and 32a and a sheath 38a housing the clamping jaws 31a and 32a at their roots. The locking unit 6a comprises pivots 61a and 62a provided on the clamping jaws 31a and 32a, respectively. Each of the pivots 61a and 62a has a threaded hole 611a or 621a, and the sheath 38a is formed with two threaded holes 381a and 382a aligned with the pivots 61a and 62a, respectively, so that two threaded bolts 63a and 64a can pass through the aligned holes 611a and 621a on the pivots 61a and 62a of the clamping jaws 31a and 32a and the threaded holes 381a and 382a of the sheath 38a, respectively. The threaded bolts 63a and 64a serve to adjust an included angle between the clamping jaws 31a and 32a bilaterally, so as to hold or release the external article. Each of the threaded bolts 63a and 64a has one end provided with an adjusting lever 631a or 641a for a user to operate and thereby drive the threaded bolt 63a or 64a to rotate.

Figure 8:
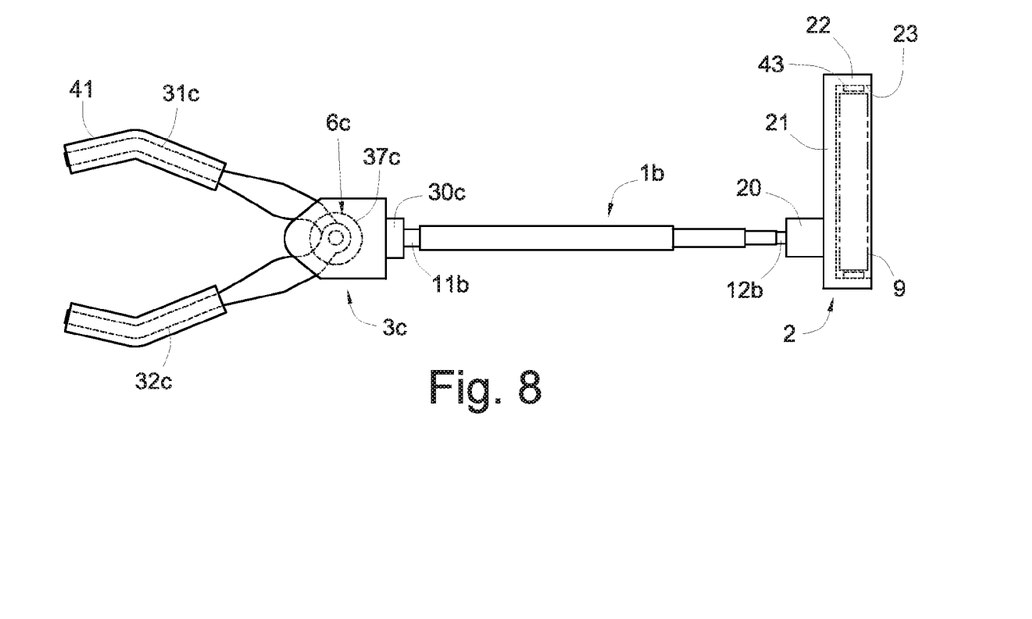
FIG. 8 is a front view of still another additional mode of FIG. 1.

Alternatively, the securing member 3c has at least two symmetrical movable clamping jaws 31c and 32c and the locking unit 6c includes a driver 65c on the securing member 3c for driving the clamping jaws 31c and 32c and thereby adjusting an included angle between the clamping jaws 31c and 32c. The driver 65c may be a motor.

Two or more sets of the two clamping jaws 31/31a/31c and 32/32a/32c may be provided for holding the external article from two or more directions. In addition, each of the clamping jaws 31, 31a, 31b, 31c, 32, 32a, 32b and 32c of the securing member 3, 3a, 3b or 3c may be provided with a cushion 41 or 42 covering its periphery or inner surface, so as to enhance close connection and friction between the clamping jaw 31, 31a, 31b, 31C, 32, 32a, 32b or 32c and the external article.

The other end of the extension rod 1, 1a or 1b has a first linking portion 11, 11a or 11b for engaging with the first connecting portion 30, 30a, 30b or 30c of the securing member 3, 3a, 3b or 3c.

The first connecting portion 30, 30a, 30b or 30c and the first linking portion 11, 11a or 11b are combined by insertion, buckle engagement, embedding, embracing, rotational connection, pivotal connection, suction, magnetism, screwing connection, velcro tapes, adhesive or being formed integratedly.

The clamping jaw 31b or 32b has a releasing device 320b. The releasing device 320b includes a root 321b pivotally connected to the securing member 3b, and a tip 322b that is pivotally connected to the root 321b and is far from the securing member 3b. The root 321b and the tip 322b have their connecting surfaces each provided with a positioning hole 323b or 324b. A positioning rod 325b passes through the positioning holes 323b, 324b so as to fix the tip 322b with respect to the root 321b. When there is an urgent need to detach the securing member 3b from the horizontal handrail 71 or the vertical handrail 72 in the public transportation vehicle, the positioning rod 325b of the releasing device 320b can be pulled out to allow the tip 322b to swing outward, so that the securing member 3b can be invalidated by pulling open the releasing device 320b.

The extension rod 1, 1a or 1b may be a unitary member or a composite member. The extension rod 1b is formed by telescoped tubes, so that the extension rod 1b is allowed to have multi-stage extension, thereby increasing an overall using length of the extension rod 1b.

Figure 4:
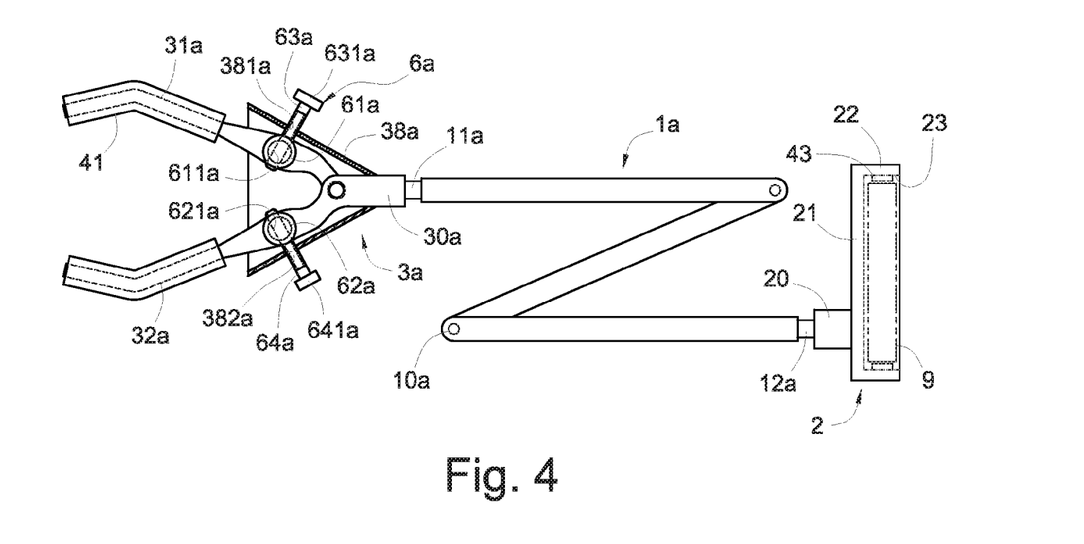
FIG. 4 is a front view of an additional mode of FIG. 1.

Alternatively, the extension rod 1a is formed by links pivotally linked by one or more movable joints 10a, so that the extension rod 1a is foldable and is allowed to have multi-stage extension, thereby increasing an overall using length of the extension rod 1a.

The extension rod 1, 1a or 1b is normally retracted in a compact size for portability, and can be extended in length or adjusted in angle to an extent where a user can conveniently view and operate the screen of the mobile device 9.

Figure 3:
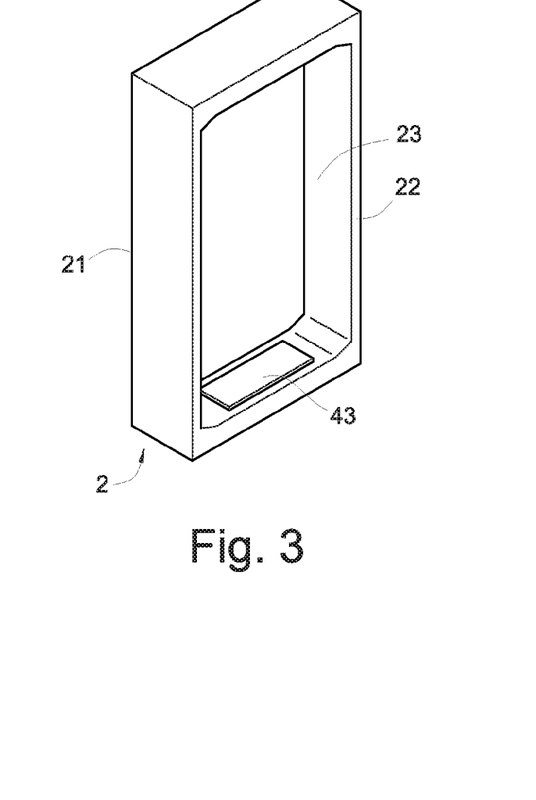
FIG. 3 is a perspective view of the positioning frame as shown in FIG. 1.

The positioning frame 2 has a second connecting portion 20 at its back, and the end of the extension rod 1, 1a or 1b has a second linking portion 12, 12a or 12b for engaging with the second connecting portion 20 of the positioning frame 2. The second connecting portion 20 and the second linking portion 12, 12a or 12b are combined by insertion, buckle engagement, embedding, embracing, rotational connection, pivotal connection, suction, magnetism, screwing connection, velcro tapes, adhesive or being formed integratedly.

The positioning frame 2 has an elastic enclosure 22 for holding the mobile device 9 in position and a base 21 around which the enclosure 22 circles so that a positioning recess 23 is defined by the base 21 and the inner wall of the enclosure 22 for receiving the mobile device 9. The base 21 has a second connecting portion 20 at its back for engaging with the second linking portion 12 of extension rod 1.

The base 21 of the positioning frame 2 has its inner side, where the mobile device 9 contacts, provided with a cushion 43, so as to enhance the anti-slip effect of the positioning frame 2 on the surface of the mobile device 9. The positioning frame 2 can pivot on the second connecting portion 20 to rotate with respect to the extension rod 1, 1a or 1b up to 90 degrees.

Thereby, the fixer is highly portable and can be quickly and conveniently attached to a horizontal handrail 71 or a vertical handrail 72 a public transportation vehicle by means of the securing member 3, 3a, 3b or 3c. Then the fixer can hold a mobile electronic device, such as a mobile phone, a portable game player, an electronic book, a GPS device or a tablet computer, in the positioning frame 2. Thus, a user can use his/her mobile device 9 in any public transportation vehicle during either a long distance trip or a short distance trip without the need of holding the mobile device 9 with his/her hand. To sum up, the disclosed fixer is highly portable and can be quickly and conveniently mounted on and dismounted from handrail 71 and 72, thereby being helpful to prevent users' muscle fatigue and ache caused by overuse of neck and shoulder muscles.

Figure 11:
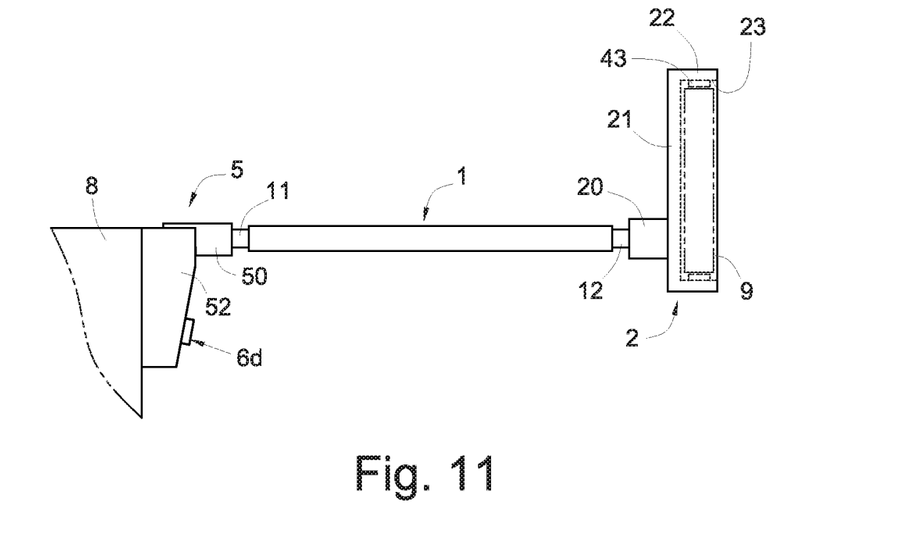
FIG. 11 is a front view of a second embodiment of the present invention.
Figure 12:
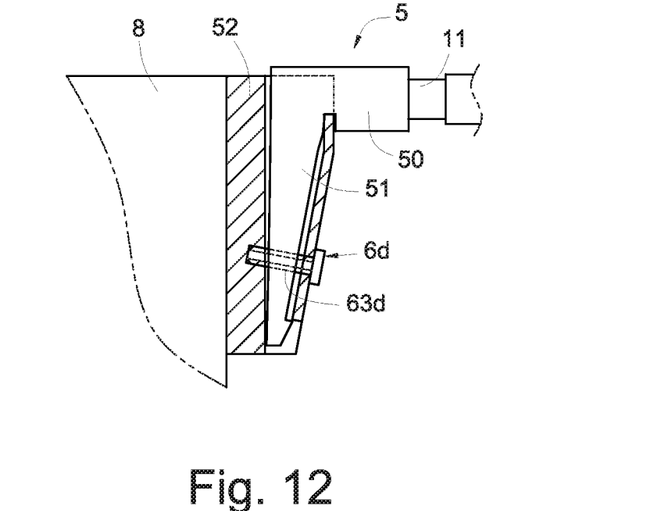
FIG. 12 is a partial, enlarged, cross-sectional view of FIG. 11.

FIG. 11 and FIG. 12 disclose a second embodiment of the present invention, which is different from the first embodiment for the following features.

A securing member 5 has a connecting tongue 51 and a connecting socket 52 that is configured to disassembly assemble with the connecting tongue 51 and be fixed to the external article 8. The securing member is assembled to the connecting socket 52 on the external article 8 through the connecting tongue 51. The locking unit 6d includes a threaded bolt 63d screwedly connected between the connecting tongue 51 and the connecting socket 52. The connecting socket 52 is fixed to the external article 8 by, a screw means, a close-fitting means, a buckle means or an adhesive means.

The external article 8 may be a backpack, a hat, a safety helmet, a shoulder strap, a sling, a tie, a brief case, a luggage case, a mask, a helmet, a handle, a wall, a table or a chair. The securing member 5 is combined with the connecting socket 52 on the external article 8 through the connecting tongue 51.

The connecting socket 52 may be formed as a fixing member on any portable article so it can be easily mounted on a user's shoulder, neck or head, or on the user's backpack, a hat or a sling and carried by the user. The connecting socket 52 in this case is made according to a general specification so it can be combined with the extension rod 1.

The connecting tongue 51, at it's the other end, has a first connecting portion 50. The first linking portion 11 of the extension rod 1 is configured to engage with the first connecting portion 50 of the connecting tongue 51. The first connecting portion 50 and the first linking portion 11 are combined by insertion, buckle engagement, embedding, embracing, rotational connection, pivotal connection, suction, magnetism, screwing connection, velcro tapes, adhesive or being formed integratedly. The rest of the second embodiment is similar to the first embodiment in terms of structure and operation.

Figure 13:
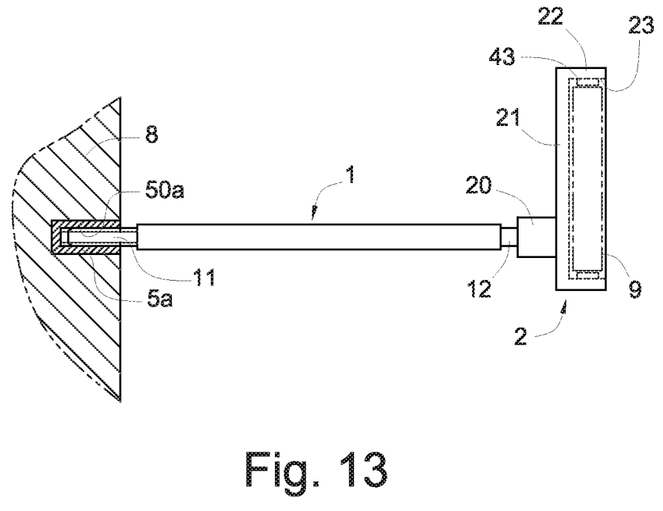
FIG. 13 is a front view of a third embodiment of the present invention.

FIG. 13 discloses a third embodiment of the present invention, which is different from the first embodiment for the following features.

The securing member 5a is provide on the external article 8, and the extension rod 1 has a first linking portion 11 at its opposite end for engaging with the first connecting portion 50a. The first connecting portion 50a and the first linking portion 11 are combined by insertion, buckle engagement, embedding, embracing, rotational connection, pivotal connection, suction, magnetism, screwing connection, velcro tapes, adhesive or being formed integratedly.

The locking unit may be the first connecting portion 50a and the first connecting portion 50a may be a threaded hole, while the first linking portion 11 may be a screw. Alternatively, the securing member 5a may be a part of the external article 8 itself, and the first connecting portion 50a in the form of screw can be formed on the external article 8 directly. The rest of the present embodiment is similar to the first embodiment in terms of structure and operation.

Figure 14:
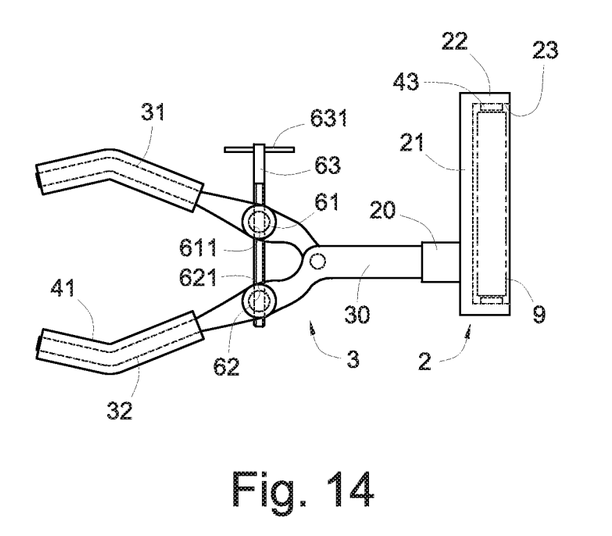
FIG. 14 is a front view of a fourth embodiment of the present invention.

FIG. 14 discloses a fourth embodiment of the present invention, which is different from the above embodiments by eliminating the extension rod.

The positioning frame 2 has a second connecting portion 20 for engaging with the first connecting portion 30 of the securing member 3. Alternatively, the securing member 5 has a connecting tongue 51 (referring to FIG. 11 and FIG. 12), and a connecting socket 52 that is configured to removably engage with the connecting tongue 51 and is positioned on the external article. The securing member 5 is coupled with the connecting socket 52 on the external article through the connecting tongue 51. The first connecting portion 50 is deposited at the other end of the connecting tongue 51. The positioning frame 2 has a second connecting portion 20 for engaging with the first connecting portion 50 of the securing member 5. Alternatively, the securing member 5a is deposited on the external article 8 (referring to FIG. 13) and the positioning frame 2 has a second connecting portion 20 for engaging with the first connecting portion 50a of the securing member 5a.

The second connecting portion 20 and the first connecting portion 30, 50 or 50a are combined by insertion, buckle engagement, embedding, embracing, rotational connection, pivotal connection, suction, magnetism, screwing connection, velcro tapes, adhesive or being formed integratedly. The rest of the present embodiment is similar to the first embodiment in terms of structure and operation.

What is claimed is:

1. A positioning device working with a fixer for handheld, portable, mobile devices, the positioning device comprising a securing member that is coupled to the fixer, the fixer having a positioning frame for holding an external mobile device in position;

the securing member comprising a first connecting portion for engaging with the fixer, the securing member being configured to fix the fixer as well as the positioning frame to an external article by grasping, buckling, mounting, enclosing, sucking or piercing the external article so as to suspend the mobile device, the securing member being able to be detached from the external article, which is a planar or bar-like article, the securing member having a locking unit for securing the securing member to the external article, and the securing member being able to grasp a horizontal or vertical, planar or bar-like article, whereby when a user touches and operates the mobile device, the mobile device is strongly positioned over the external article by the locking unit and prevented from swinging or being displaced;

wherein the securing member comprises two symmetrical clamping jaws, each of the clamping jaws having the same size in length, the locking unit comprising a threaded bolt and pivots respectively provided at corresponding locations of the clamping jaws, each said pivot formed with a threaded hole, so that the threaded bolt is screwedly connected between the clamping jaws and passes through the threaded holes for adjusting an included angle formed between the clamping jaws, so as to hold or release the external article, in which the threaded bolt has one end provided with an adjusting lever for being operated to drive the threaded bolt to rotate, the adjusting lever located above one of the clamping jaws within the length of the one of the clamping jaws; one of the clamping jaws having a releasing device that comprises a root pivotally connected to the securing member and a tip that is pivotally connected to the root and far away from the securing member, the root and the tip having connecting surfaces thereof each provided with a positioning hole, and a positioning rod passing through the positioning holes so as to combine the tip with the root.

2. The positioning device of claim 1, wherein the positioning frame includes a second connecting portion that is configured to engage with the first connecting portion of the securing member.

3. The positioning device of claim 1, wherein the fixer further comprises an extension rod that is rigid in a vertical direction or in a horizontal direction and the positioning frame is attached to one end of the extension rod while the securing member is coupled to an opposite end of the extension rod.

4. The positioning device of claim 3, wherein the extension rod has the opposite end provided with a first linking portion for engaging with the first connecting portion of the securing member.

5. The positioning device of claim 1, wherein the at least one clamping jaw comprises two symmetrical clamping jaws, and the locking unit comprises a driver provided in the securing member for driving the clamping jaws to move and adjust an included angle between the clamping jaws.

6. The positioning device of claim 1, wherein the clamping jaw is covered by a cushion, so as to enhance close connection and friction between the clamping jaw and the external article.

7. A positioning device working with a fixer for handheld, portable, mobile devices, the positioning device comprising a securing member that is coupled to the fixer, the fixer having a positioning frame for holding an external mobile device in position;

the securing member comprising a first connecting portion for engaging with the fixer, the securing member being configured to fix the fixer as well as the positioning frame to an external article by grasping, buckling, mounting, enclosing, sucking or piercing the external article so as to suspend the mobile device, the securing member being able to be detached from the external article, which is a planar or bar-like article, the securing member having a locking unit for securing the securing member to the external article, and the securing member being able to grasp a horizontal or vertical, planar or bar-like article, whereby when a user touches and operates the mobile device, the mobile device is strongly positioned over the external article by the locking unit and prevented from swinging or being displaced;

wherein the securing member comprises two symmetrical clamping jaws, each of the clamping jaws having the same size in length, the locking unit comprising a threaded bolt and pivots respectively provided at corresponding locations of the clamping jaws, each said pivot formed with a threaded hole, so that the threaded bolt is screwedly connected between the clamping jaws and passes through the threaded holes for adjusting an included angle formed between the clamping jaws, so as to hold or release the external article, in which the threaded holt has one end provided with an adjusting lever for being operated to drive the threaded bolt to rotate, the adjusting lever located above one of the clamping jaws within the length of the one of the clamping jaws, the positioning frame comprising an elastic enclosure and a base around which the enclosure circles so that a positioning recess is defined by the base and the inner wall of the enclosure for receiving the mobile device.

* * * * *